(12) United States Patent
Morishita et al.

(10) Patent No.: US 7,081,880 B2
(45) Date of Patent: Jul. 25, 2006

(54) IMAGE DISPLAY DEVICE

(75) Inventors: Shunsuke Morishita, Mobara (JP); Tomohide Oohira, Mobara (JP); Yohio Oowaki, Mobara (JP)

(73) Assignees: Hitachi Displays, Ltd., Chiba-Ken (JP); Hitachi Device Engineering Co., Ltd., Chiba-Ken (JP)

( * ) Notice: Subject to any disclaimer, the term of this patent is extended or adjusted under 35 U.S.C. 154(b) by 245 days.

(21) Appl. No.: 10/394,189

(22) Filed: Mar. 24, 2003

(65) Prior Publication Data
US 2003/0214494 A1 Nov. 20, 2003

(30) Foreign Application Priority Data
Mar. 22, 2002 (JP) ............................. 2002-079928

(51) Int. Cl.
*G09G 3/36* (2006.01)
(52) U.S. Cl. ...................................... 345/102; 345/905
(58) Field of Classification Search ................ 345/30, 345/32, 36, 38, 40, 87, 88, 905, 31, 50, 55, 345/83, 84, 102; 361/681, 682, 679; 248/917–919
See application file for complete search history.

(56) References Cited

U.S. PATENT DOCUMENTS

| 6,031,328 A | * | 2/2000 | Nakamoto | ................... | 313/495 |
| 6,094,340 A | * | 7/2000 | Min | ........................... | 361/681 |
| 2001/0033265 A1 | * | 10/2001 | Mishima et al. | .............. | 345/92 |
| 2003/0210210 A1 | * | 11/2003 | Ide et al. | ...................... | 345/30 |

* cited by examiner

*Primary Examiner*—Bipin Shalwala
*Assistant Examiner*—Nitin Patel
(74) *Attorney, Agent, or Firm*—Reed Smith LLP; Stanley P. Fisher, Esq.; Juan Carlos A. Marquez, Esq.

(57) ABSTRACT

An image displaying apparatus at least including a first structure component, a second structure component, a third structure component and a displaying unit are provided, in which it is characterized that each of the first structure component, the second structure component and the third structure component has a section at which the first structure component, the second structure component and the third structure component are disposed in the order from an inside of the image displaying apparatus on a side face thereof, and each of the first structure component and the third structure component has in a part of the section a fixing portion for being fitted to the second structure component at each of positions thereon approximately equal to each other.

23 Claims, 8 Drawing Sheets

IMAGE DISPLAY DEVICE

BACKGROUND OF THE INVENTION

1. Field of the Invention

The present invention relates to an image displaying apparatus.

2. Description of the Related Art

There are known two kinds of methods for fixing structure components of an image displaying apparatus, i.e. a method by caulking and a method of screwing. Moreover, a method of fitting structure components to each other is disclosed in JP-A-2001-33764.

SUMMARY OF THE INVENTION

As a displaying apparatus is upsized, there becomes known a technique for making up the image displaying apparatus by using three frames of a first, a second and a third. However, the inventor has found that an image displaying apparatus having two or more frames is liable to be adversely affected by resonance of the frames as a screen is upsized and becomes easily damaged by vibration. Moreover, it was found that, at the resonance, displaying elements, forming an image displaying unit, are vibrated with a large amplitude to cause degradation in reliability due to generation of disconnection of wiring, scratches due to the movement of components such as beads being contained inside and irregularity, and generation of nonuniformity in a displayed image. Furthermore, it was found that a vibration with a large amplitude sometimes causes damage in a connection between frames.

A first advantage according to the invention is that countermeasures are taken against the resonance of the image displaying apparatus having the two or more frames and further, simplified assembling work is brought into realization for the apparatus having the two or more frames.

An image displaying apparatus, being formed with a plurality of structure components overlaid with one another, necessitates horizontal positioning of the components. A second advantage according to the invention is that a new structure and a new fixing method, which surely and easily enable realization of the horizontal positioning, are brought into realization.

In an image displaying apparatus, as a degree of definition is enhanced, kinds of signals to be treated are increased. For example, in an image displaying apparatus that complies with SXGA standard, it is necessary that the apparatus is compatible with at least four kinds of signals specified by four standards, VGA, SVGA, XGA and SXGA, respectively. This is because the above signal of every kind is internationally standardized as an output signal from a PC. A third advantage according to the invention is that an image displaying apparatus is brought into realization which can display an image with a stabilized image quality even for such signals of various kinds.

In an image displaying apparatus, a high-definition capable signal is to be provided with a frequency thereof made higher. This results in causing degradation in EMI and an increase in errors in the signal. A fourth advantage according to the invention is that an image displaying apparatus with improved EMI and reduced errors in a signal is brought into realization.

The invention provides the above advantages. Only any part of advantages of the above can be of course used.

Main examples of the invention are shown as follows.

Examples of bringing about realization of the first advantage are shown as:

(1) In an image displaying apparatus at least including a first structure component, a second structure component, a third structure component and a displaying unit, it is characterized that each of the first structure component, the second structure component and the third structure component has a section at which the first structure component, the second structure component and the third structure component are disposed in the order from an inside of the image displaying apparatus on a side face thereof, and each of the first structure component and the third structure component has in a part of the section a fixing portion for being fitted to the second structure component at each of positions thereon approximately equal to each other.

(2) In the item (0), it is characterized that a backlight is further included, the backlight is supported by the first structure component, the displaying unit is supported by the second structure component, and the third structure component is disposed on an upper side of the displaying unit with an opening therefore being provided, and each of the first structure component and the third structure component has a fixing portion for being fitted to the second structure component on each of a front side and a rear side thereof at positions approximately equal to each other.

(3) In the item (1), it is characterized that the fixing portion is a portion with a hole provided in each of the first structure component and the third structure component, which is fitted to each of the projections provided on the second structure component for fixing.

(4) In the item (1), it is characterized that the fixing portion is a portion with a hole provided in each of the first structure component and the third structure component, which is fitted to each of the projection-like thick portions provided on the second structure component for fixing.

(5) In the item (3), it is characterized that one of the projections is formed on the first structure component side to be flat with a wide projecting width on a side of a displaying face, and the other is formed on the third structure component side to be flat with a wide projection width on a side opposite to the side of the displaying face.

(6) In the item (4), it is characterized that one of the thick portions is formed on the first structure component side to be flat with a wide projecting width on a side of a displaying face, and the other is formed to be flat on the third structure component side with a wide projection width on a side opposite to the side of the displaying face.

(7) In the item (1), it is characterized that the thicknesses in the fixing portions of the third structure component, the first structure component and the second structure component become larger in the order.

(8) In the item (5), it is characterized that the projection on the first structure component side is formed to have a wide projection width larger than the wide projection width of the projection on the third structure component side.

(9) In the item (1), it is characterized that the second structure component is made of resin material.

(10) In the item (9), it is characterized that the first structure component and the third structure component are made of metallic material.

(11) In the item (1), it is characterized that at least three of the fixing portions are formed on one side face of the image displaying apparatus

(12) In the item (1), it is characterized that the fixing portions are provided on a first side face and a second side face, being perpendicular to each other, of the image displaying apparatus, the number of the fixing portions on the first side face being different from the number of the fixing portions on the second side face.

Examples of bringing about realization of the second advantage are shown as:

(13) In an image displaying apparatus at least including a displaying unit, a first structure component, a second structure component and a third structure component, it is characterized that a part of the first structure component is bent toward a side of the third structure element to be provided as a bent portion for carrying out horizontal positioning of the second structure component with the bent portion.

(14) In the item (13), it is characterized that the third structure component is a frame supporting the displaying unit, the second structure component is a component forming a backlight unit, and the first structure component is a frame supporting the backlight unit.

(15) In the item (14), it is characterized that the displaying unit is provided on the third structure unit.

(16) In the item (15), it is characterized that the second structure component is an optical sheet.

(17) In the item (16), it is characterized that the optical sheet includes one of a light diffusing medium and a light concentrating medium.

(18) In the item (15), it is characterized that the second structure component is a light guide plate.

(19) In the item (13), it is characterized that the first structure component is a metal frame and the third structure component is a resin frame.

(20) In the item (13), it is characterized that the third structure component is provided with a portion with a hole into which a tip of the bent portion is fitted.

(21) In the item (20), it is characterized that the tip of the bent portion is positioned to the side of the third structure component 1 mm or more from the second structure component.

(22) In the item (20), it is characterized that the tip of the bent portion sticks out from a surface of the portion with the hole in the third structure component.

(23) In the item (13), it is characterized that the third structure component has a projected portion which holds the bent portion between the projected portion and the second structure component.

Examples of bringing about realization of the third advantage are shown as:

(24) In an image displaying apparatus including a controller to which at least a displaying data signal and a clock signal are inputted from outside, an image signal driving circuit to which displaying data is supplied from the controller, a scanning signal driving circuit to which a control signal is supplied from the controller, a plurality of image signal lines connected to the image signal driving circuit, a plurality of scanning signal lines connected to the scanning signal driving circuit, and a thin film transistors each being provided near each of intersections of the scanning signal lines and the image signal lines, it is characterized that the image displaying apparatus is compatible with signals inputted from outside with frequencies over a plurality of kinds, and carries out control for making a period between a rising edge of the image signal and a rising edge of the scanning signal approximately equal among a plurality of kinds of the signals inputted from outside.

(25) In the item (24), it is characterized that the image displaying apparatus has a built-in clock circuit which generates a clock signal to measure number of clocks in a unit time in the clock signal inputted from outside, and carries out control of the period between the rising edge of the image signal and the rising edge of the scanning signal by increasing the number of the clocks in the clock signal inputted from outside in the period between the rising edge of the image signal and the rising edge of the scanning signal when the measured number of the clocks is larger than a specified number, and by decreasing the number of the clocks in the period between the rising edge of the image signal and the rising edge of the scanning signal when the measured number of the clocks is smaller than the specified number.

Examples of bringing about realization of the fourth advantage are shown as:

(26) In an image displaying apparatus including a controller to which at least a displaying data signal are inputted from outside, an image signal driving circuit to which displaying data is supplied from the controller, a scanning signal driving circuit to which a control signal is supplied from the controller, a plurality of image signal lines connected to the image signal driving circuit, a plurality of scanning signal lines connected to the scanning signal driving circuit, and a thin film transistors each being provided near each of intersections of the scanning signal lines and the image signal lines, it is characterized that the image displaying apparatus has a first bus line and a second bus line each for supplying the displaying data, the first bus line and the second bus line are formed on a signal transmitting circuit board, and the first bus line and the second bus line have respective beginnings approximately at the center of the signal transmitting circuit board for being extended thereon in directions opposite to each other.

(27) In an image displaying apparatus including a controller to which at least a displaying data signal are inputted from outside, an image signal driving circuit to which displaying data is supplied from the controller, a scanning signal driving circuit to which a control signal is supplied from the controller, a plurality of image signal lines connected to the image signal driving circuit, a plurality of scanning signal lines connected to the scanning signal driving circuit, and a thin film transistors each being provided near each of intersections of the scanning signal lines and the image signal lines, it is characterized that the image displaying apparatus has a first bus line and a second bus line each for supplying the displaying data, the first bus line and the second bus line are formed on a signal transmitting circuit board, and the signal transmitting circuit board is provided with thereon a region for extending the first bus line, a region formed with no first and second bus lines and a region for extending the second bus line formed in the order in a longitudinal direction of the board.

(28) In an image displaying apparatus including, a controller to which at least a displaying data signal are inputted from outside, an image signal driving circuit to which displaying data is supplied from the controller, a scanning signal driving circuit to which a control signal is supplied from the controller, a plurality of image signal lines connected to the image signal driving circuit, a plurality of scanning signal lines connected to the scanning signal driving circuit, and a thin film transistors each being provided near each of intersections of the scanning signal lines and the image signal lines, it is characterized that the image displaying apparatus has a first bus line for supplying the displaying data onto the left side of the apparatus and a second bus line for supplying the displaying data onto the right side of the apparatus, and the first bus line and the second bus line are supplied with the respective displaying data in synchronous with each other.

(29) In an image displaying apparatus including, a controller to which at least a displaying data signal are inputted from outside, an image signal driving circuit to which displaying data is supplied from the controller, a scanning signal driving circuit to which a control signal is supplied from the controller, a plurality of image signal lines connected to the image signal driving circuit, a plurality of scanning signal lines connected to the scanning signal driving circuit, and a thin film transistors each being provided near each of intersections of the scanning signal lines and the image signal lines, it is characterized that displaying data on the left side of the image displaying apparatus and displaying data on the right side of the apparatus are supplied to the image signal driving circuit in synchronous with each other.

In the invention, for achieving any one of the above first to fourth advantages, technical concepts in the examples disclosed in corresponding one of the above advantages can be employed. In addition, for achieving a plurality of advantages of the above first to fourth advantages, the examples disclosed in the respective advantages can be employed in combination.

DESCRIPTION OF THE PREFERRED EMBODIMENT

Explanations will be made about typical structures characterizing the invention in the following with reference to embodiments.

Embodiment 1

Figure 1:
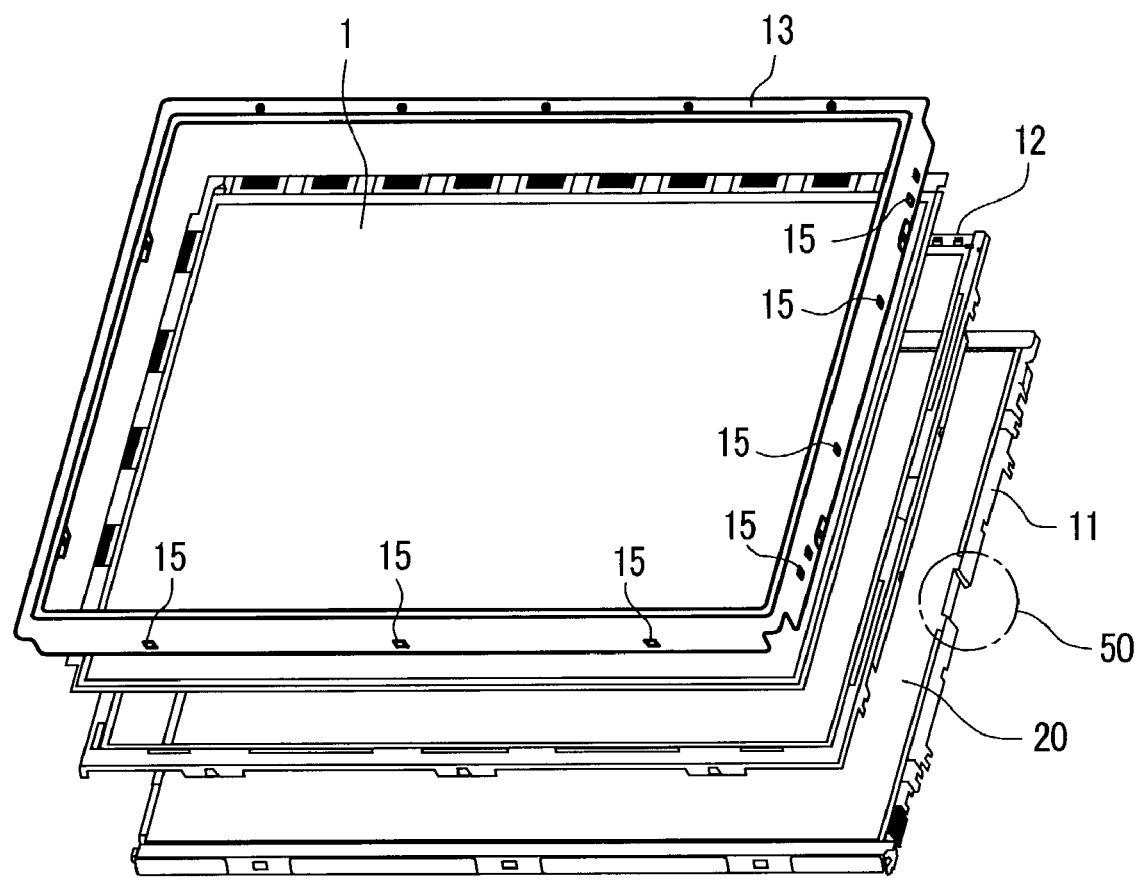
FIG. 1 is a perspective view schematically showing an embodiment of a structure of an image displaying apparatus according to the invention in a state before being assembled.
Figure 2:
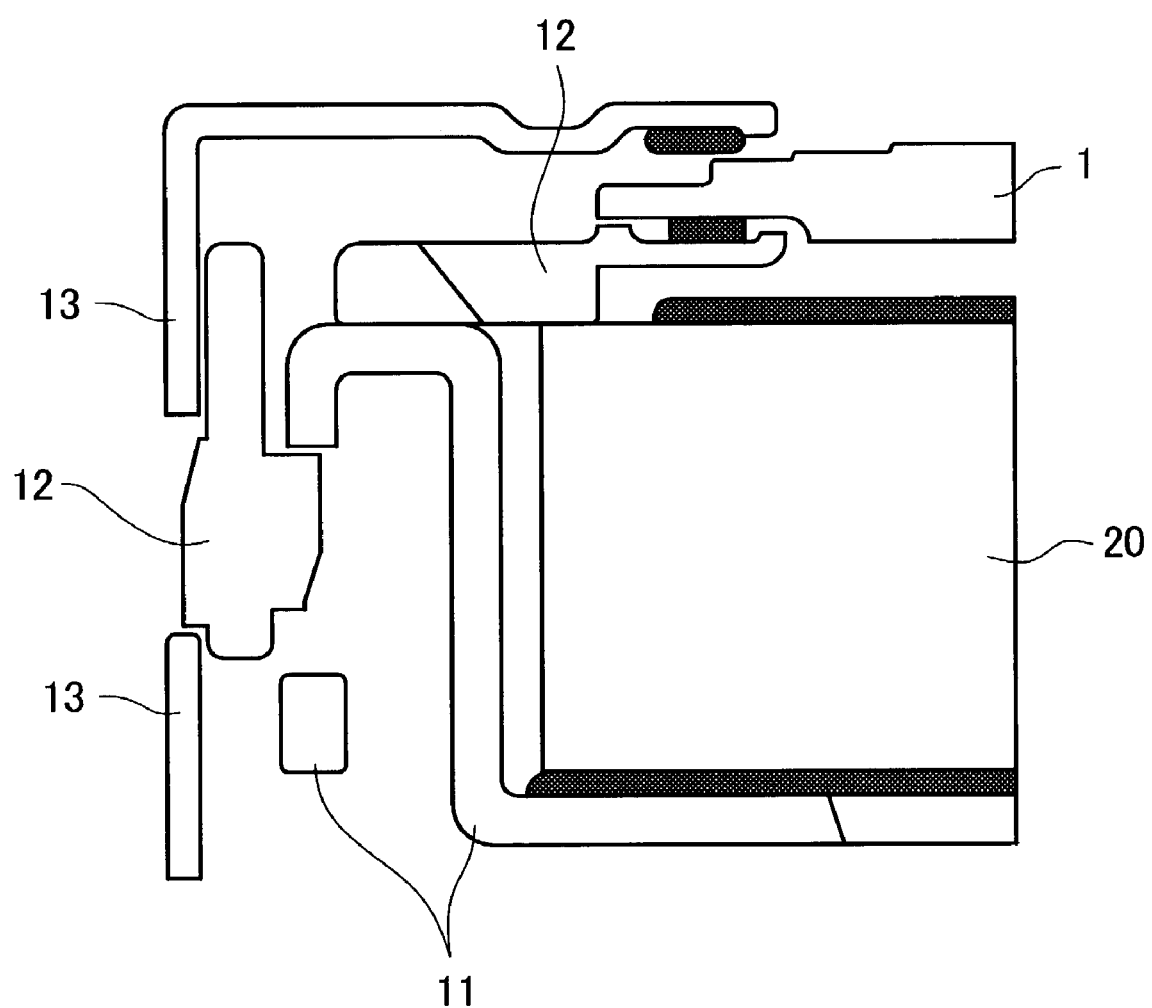
FIG. 2 is a cross sectional view showing an example of a structure near a fixing portion as a principal part of the embodiment of the image displaying apparatus according to the invention.

FIG. 1 is a perspective view schematically showing an embodiment of a structure of an image displaying apparatus according to the invention in a state before being assembled. A backlight unit 20 is supported on a bottom frame 11. The bottom frame 11 is made of metal, which serves for assuring strength as well as providing GND. FIG. 1 shows an example of a side backlight type, in which most of the backlight unit 20 is formed with a light guide plate. Reference numeral 12 denotes an intermediate frame formed of a resin. This allows the intermediate frame 12 to be easily formed into a complicated shape for sharing various kinds of roles. The intermediate frame 12 in FIG. 1 also plays a role as a supporting structure as well as a positioning structure for a displaying unit 1 mounted thereon. Moreover, the intermediate frame 12, as will be explained later, plays an important role as a fixing structure component in the invention. On an upper face of the displaying unit 1, an upper frame 13 having an opening is disposed. The upper frame 13 is made of metal to play a role for assuring strength as well as for providing GND. The image displaying apparatus in FIG. 1 has three frames, the bottom frame 11, the intermediate frame 12 and the upper frame 13, as a frame structure. By providing the intermediate frame, even in a large sized image displaying apparatus, assured positioning of a displaying unit is made possible. Furthermore, as shown in FIG. 2, it becomes possible to provide a space between the backlight unit 20 and the displaying unit 1. This can structurally avoid occurrence of inconvenience due to distortion of an optical sheet on the surface of the backlight unit 20 or sticking of the optical sheet to the backlight unit 20 both induced by close contact of the backlight unit 20 and the displaying unit 1. The image displaying apparatus with such a structure, however, has a problem of spending more time in fixing than in the case with two frames. Further, there is a problem of easily causing fixed parts to be out of position. In addition, when fixing frames to one another, the frames are made to have fixed portions and free portions. This makes a structure, supported at the fixed portion and resonating with a certain resonant frequency, included in the image displaying apparatus as a structure characteristic to the image displaying apparatus. Here, when three or more frames are provided, there arises two kinds of resonant frequencies, a resonant frequency in a vibration of a structure with a fixing portion of an intermediate frame and an upper frame taken as a support, and a resonant frequency in a vibration of a structure with a fixing portion of an intermediate frame and a bottom frame taken as a support, to degrade vibration resistant characteristic of an image displaying apparatus. This was found as a new problem.

In the embodiment, an increase in the kinds of resonant frequencies is eliminated. Namely, by providing the fixing portion of the intermediate frame and the upper frame, and the fixing portion of the intermediate frame and the bottom frame at the same spot, the increase in the kinds of resonant frequencies was structurally eliminated.

Reference numeral 15 in FIG. 1 denotes a fixing portion in the embodiment which point is provided at a corresponding spot in each of the upper frame, the intermediate frame and the bottom frame. FIG. 2 is a cross sectional view showing an example of a structure near the fixing portion 15. The bottom frame 11 has a hole at a part of its side face. To the hole, a projection of the intermediate frame 12 is made fitted. The intermediate frame 12 further has a projection at the same position on an opposite side. The projection is made fitted to a hole provided on the upper frame 13.

Therefore, the upper frame 13, the intermediate frame 12 and the bottom frame 11 are made fixed at the same spot. It can be also said that the upper frame and the lower frame are provided with holes at positions corresponding to a front side and a rear side of the projection in the intermediate frame 12, respectively. Such a fixing structure is not limited to relationships among the upper frame, the intermediate frame and the bottom frame. With a structure having a third frame instead of the upper frame, a second frame instead of the intermediate frame 12 and a first frame instead of the bottom frame 11, realization of reduced resonance is allowed by a similar fixing structure.

Moreover, as shown in FIG. 2, the projection in the intermediate frame projects out on both sides. So the part is constructed with thick portions. Thus, the strength of the fixing portion is increased to make it possible to provide a structure in which the fixing portion is hard to be damaged even when resonance occurs. In FIG. 2, the bottom frame 11 has a bent portion and a bent back portion in a part of which a portion with a hole is provided. This can prevent a distortion, occurred at fixing by the portion with the hole, from being directly transmitted to the backlight unit 20. Therefore, uniformity of brightness of the backlight unit 20 can be enhanced for realization of an image displaying apparatus with uniform brightness.

For realization of such a structure, it is desirable that the intermediate frame 12 is made of resin material that can be formed into a complicated shape. Moreover, it is necessary that the portion with the hole has strength, so that the upper frame and the bottom frame are desirably made of metallic material.

Figure 3:
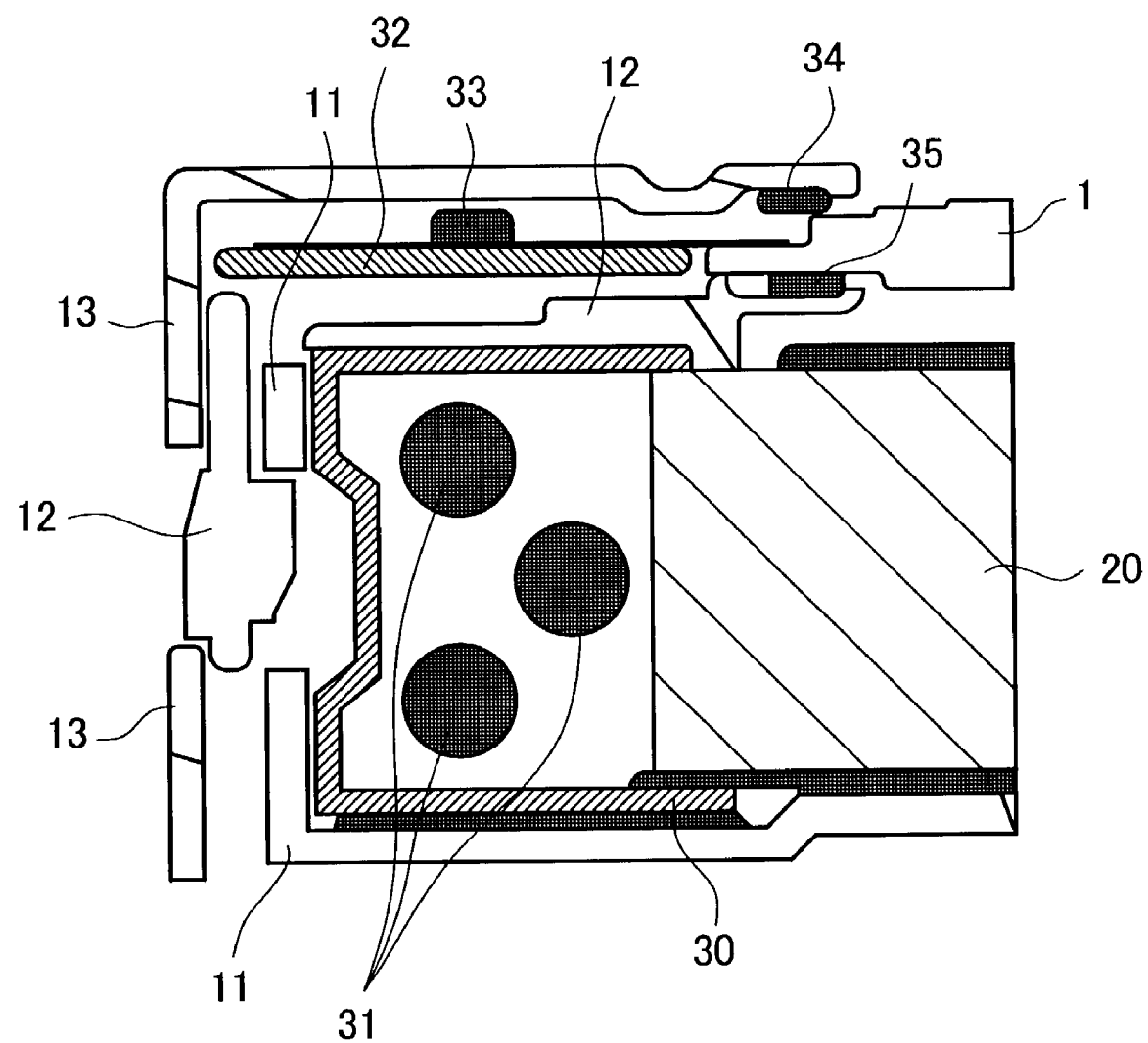
FIG. 3 is a cross sectional view showing another example of a structure equivalent to the structure shown in FIG. 2.

FIG. 3 is a view showing another structure equivalent to the structure shown in FIG. 2. This corresponds to the side on which light sources in the backlight unit 20 are disposed. Reference numeral 30 denotes a reflector plate and 31 denotes a light source made up with LEDs or fluorescent tubes. Reference numeral 32 denotes a printed circuit board, reference numeral 33 denotes a semiconductor element, reference numeral 34 denotes a cushion spacer between the upper frame 13 and the displaying unit 1, and reference numeral 35 denotes a cushion spacer between the intermediate frame 12 and the displaying unit 1. By the cushion spacers 34 and 35, the displaying unit 1 is to be held with elasticity.

The bottom frame 11 shown in FIG. 3, unlike the one shown in FIG. 2, has no bent back portion, but has a hole formed in the bent portion, which provides fixing similar to the fixing shown in FIG. 2. This is because a recess provided on the reflector plate 30 in a region facing the hole can prevent a force from the fixing portion from being directly transmitted onto the light guide plate without the bent back portion.

Figure 4:
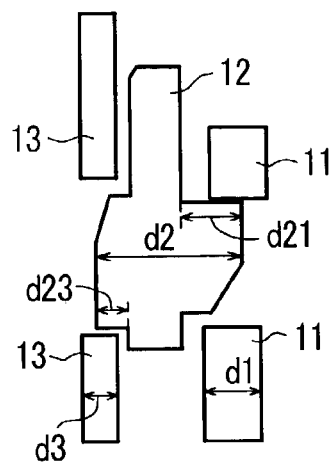
FIG. 4 is an explanatory view illustrating an example of a structure of the fixing portion more in detail.

FIG. 4 is an explanatory view illustrating an example of a structure of the fixing portion more in detail. The bottom frame 11 having a thickness d1 is provided with a hole to which a projection of the intermediate frame 12 is made fitted. The projection of the intermediate frame 12 is formed so as to be in flat on the upper side as a side of a displaying face with a projection width d21 from the intermediate frame. With the projection formed in flat on the upper side, by pressing the bottom frame into the intermediate frame from the bottom side, or by pressing the intermediate frame into the bottom frame from the upper side, the projection of the intermediate frame is to be fitted into the portion with the hole in the bottom frame. The projection, once being fitted, because of the upper side of the projection being formed in flat, becomes hard to be disengaged to provide realization of a strong fixing.

The upper frame 13 having a thickness d3 is provided with a hole to which another projection of the intermediate frame 12 is made fitted. The projection of the intermediate frame is formed so as to be in flat on the bottom side as a side opposite to the displaying face with a projection width d23 from the intermediate frame. With the projection formed in flat on the bottom side, by pressing the upper frame into the intermediate frame from the upper side, or by pressing the intermediate frame into the upper frame from the bottom side, the projection of the intermediate frame is to be fitted into the portion with the hole in the upper frame. The projection, once being fitted, because of the bottom side of the projection being formed in flat, becomes hard to be disengaged to provide realization of a strong fixing.

For making assembly easily carried out, the intermediate frame 12 is pressed into the bottom frame 11 assembled with the backlight unit 20, and the displaying unit 1 is mounted on the intermediate frame 12, into which the upper frame 13 is pressed from over the displaying unit 1. This allows realization of easy and simple assembly as well as a strong structure. At this time, since the fixing portions are provided at positions identical with each other, it is known that, when the intermediate frame and the upper frame are fixed to each other, the respective fixing portions of the intermediate frame and the bottom frame are at the same position. Thus, by applying a force to the position of the fixing portions to fix the upper frame and the intermediate frame, the intermediate frame and the bottom frame are combined at the same time. In this way, a structure is provided with which no misoperation is caused.

At the fixing portion, a thickness d2 of the intermediate frame 12 as a second structure component is the maximum, next to which the thickness d1 of the bottom frame 11 as a first structure component and the thickness d3 of the upper frame 13 as a third structure component are provided in the order of thickness. That is, a relation of d2>d1>d3 is satisfied. This is because the projection of the intermediate frame, required for being structurally projected, is necessary for being thick. Further, this is because the bottom frame supporting the backlight unit 20 is required to have strength, and because the bottom frame, to which pressing forces are two times applied at fixing as explained above, is required to have further strength. The upper frame is desirably thinner than the bottom frame for being made light weight. Further, variation in the thickness d1 and the thickness d2 brings about realization of an effect of reducing intensity of resonance taking the projection as a support. The projection is formed with the projection width d21 on the bottom frame side taken as being larger than the projection width d23 on the upper frame side, that is, as d21>d23. This can improve the projection about strength of the component and easiness for fitting, that is, about workability.

Three or more fixing portions 15 are, as shown in FIG. 1, desirably provided on one side. This is because one or a plurality of fixing portions, provided between the fixing portions at both end portions of the one side additionally thereto, can significantly reduce an amplitude even when resonance occurs.

Furthermore, as shown in FIG. 1, three of the fixing portions 15 are formed on a side face of the bottom side, and four on a side face of the right side. That is, the numbers of the fixing portions on the side faces at right angles to each other are different from each other. This can provide a less resonance amplitude than that in the case when the numbers are made equal to each other.

Moreover, in FIG. 1, as an example, the number of the fixing portions on a longitudinal side is made less than the number on a lateral side. This can provide a large difference between a distance between the fixing portions on the lateral side and a distance between the fixing portions on the longitudinal side to make it possible to reduce the resonance more. Further, combination can be made strong on the side of the lateral side having a higher possibility of being grasped at work by human hands. This enhances handling easiness at work.

As shown in FIG. 1 and FIG. 2, the bottom frame 11 supports the backlight unit 20. This makes it desirable to provide a device of some kind for preventing the backlight unit from moving in the horizontal direction. This is because the device allows realization of prevention against displacement caused when vibration or impact is applied, and prevention against displacement in environments at various temperatures. Furthermore, by providing such a device at a position other than the end portions of the side of the displaying apparatus, assembly work can be carried out with the position taken as a marking to also allow improvement in workability. Thus, in the embodiment, as an example of the device, a positioning section was provided as denoted by reference numeral 50 in FIG. 1.

Figure 5:
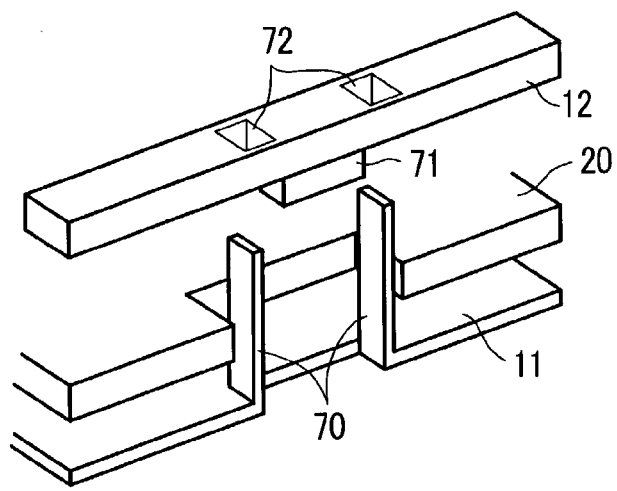
FIG. 5 is a perspective view schematically showing an example of a positioning section in the embodiment.

FIG. 5 is a perspective view schematically showing the positioning section denoted by reference numeral 50 in FIG. 1. A part of the bottom frame 11 is bent to be a pair of bent portions 70. A part of the backlight unit 20 is made to form a recess across the bent portions 70 and a space between the bent portions. This provides a structure for positioning the backlight unit 20 by means of the bent portions 70. The structure has a large advantage of necessitating no particular additional parts to allow the structure to be easily arranged at a low cost. The positioning with the structure can be applied to either the whole structure of the backlight unit 20 or the light guide plate. In addition, the structure can be applied to either a light diffusing plate or an optical sheet such as a light diffusing medium and a light concentrating medium. Since the explanation is made about the bottom frame as the first structure component and the backlight unit as the second structure component, the positioning with the structure can be of course applied to a structure having at least a first structure component and a second structure component.

For ensuring positioning accuracy, the bent portion 70 is desirably made to reach up to a position higher than the backlight unit 20 by 1 mm or more. This is for maintaining a positioning effect in the horizontal direction even when the backlight unit is moved up and down by external vibration.

Figure 6:
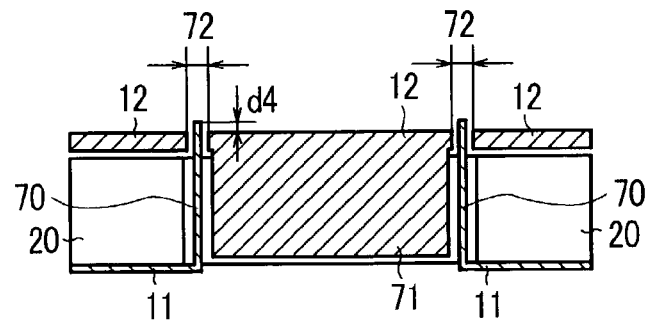
FIG. 6 is an explanatory cross sectional view showing a structure around the positioning section shown in FIG. 5.

In the embodiment, a structure is further provided with a pair of holes 72 provided in a part of the intermediate frame 12. To each of the holes, the bent portion 70 is made fitted. This makes each end of the bent portions 70 fix to prevent the bent portions from being deformed. Thus, once attained positioning can be maintained with high accuracy. For enhancing the effect, it is very effective to provide a holder 71 projected downward from the intermediate frame. An explanatory view of a cross section around the hole is shown in FIG. 6 in which the structure shown in FIG. 5 is in a step of having been assembled. As is apparent from FIG. 6, each of the bent portions 70 is in being put between the backlight unit 20 and the holder 71. This provides a structure by which positions of the bottom frame, backlight unit and the intermediate frame are mutually determined to be hardly likely to cause displacement and distortion. Namely, this is because a displacement of the bottom frame is prevented by the backlight unit and the intermediate frame, a displacement of the backlight unit is prevented by the bottom frame and the intermediate frame, and a displacement of the intermediate frame is prevented by the bottom frame and the backlight unit. The effect of preventing displacements among the three can be of course exhibited also when the upper frame is provided instead of the intermediate frame. Namely, presence of the first structure component, the second structure component and the third structure component provides a structure for mutually preventing the three structure components from their respective displacements.

The bent portion 70 is desirably arranged to have a projected portion projected by d4>0 from the surface of the intermediate frame 12. This is for enhancing workability at fitting the bent portion and for preventing the bent portion from coming off the hole. From the viewpoint of enhancing workability, the projected portion is desirably projected by 1 mm or more.

Next to this, in an image displaying apparatus, it is necessary for displaying a high-definition capable signal to treat high frequency signals in compliance with an increase in number of pixels. This is because there is an increase in amount of displaying data to be transmitted in a unit time. This, however, causes problems of degradation of EMI, an increase in signal errors and an increase in noise on a display screen.

Figure 11:
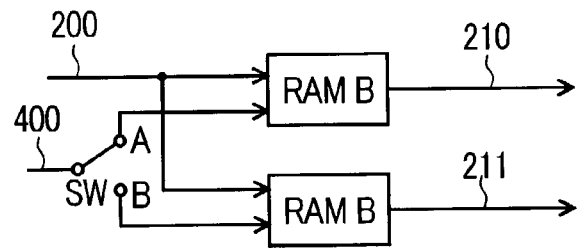
FIG. 11 is a schematic explanatory view illustrating signal processing in an embodiment of the image displaying apparatus according to the invention.

In FIG. 11, an explanation will be made about a concept of solving measure. An input data signal 200 from outside are inputted to either one of a RAM A and RAM B, storage regions divided into two, which one is selected through either of A and B selected with a switch SW by a selection signal 400. The RAM A and the RAM B can be RAMs physically separated from each other, or can be ones into which a region in one medium is divided. It is recommended that the RAMs are arranged to be built in a later-explained controller 120. This is because such an arrangement can avoid an increase in number of components to cause no increase in cost. From the RAM A and the RAM B, first displaying data 210 and a second displaying data 211 are outputted, respectively. At this time, the first displaying data 210 and the second displaying data 211 are outputted in synchronism with each other. This makes it possible to reduce a frequency of each of the displaying data to half to allow realization of improvement in EMI, reduction in signal errors and reduction in noise. Furthermore, there are also provided advantages of facilitating a design of a wiring circuit board and enabling realization of cost reduction.

Figure 12:
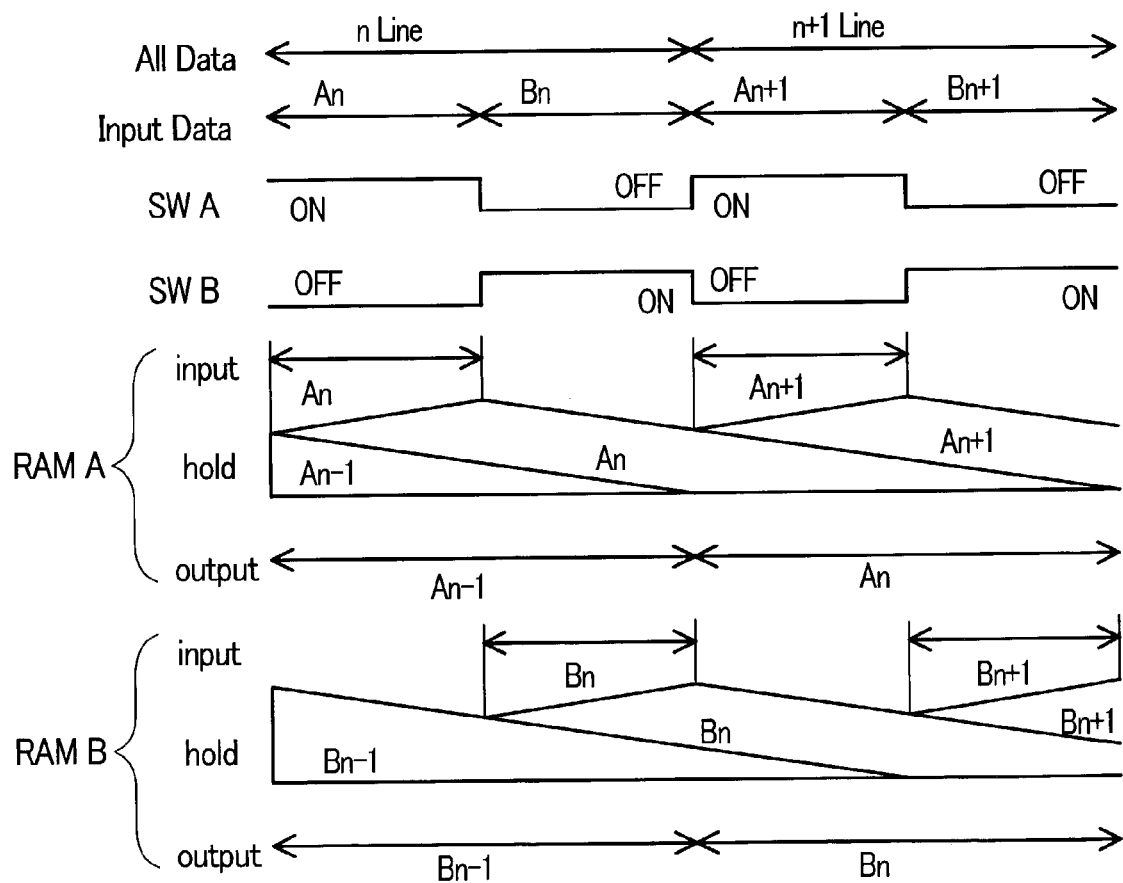
FIG. 12 is a view more specifically illustrating states of the signals shown in FIG. 11.

FIG. 12 is a view more specifically illustrating states of the signals shown in FIG. 11. The input data signals are inputted in order in such a way as a displaying data for n-th line, then a displaying data for (n+1)-th line, and so on. At this time, the inputted displaying data are divided into A in a first half and B in a second half. The data A are the displaying data corresponding to, for example, a display on the left side of the screen. The data B are the displaying data corresponding to, for example, a display on the right side of the screen. Therefore, the data for the n-th line are inputted in the order of An, Bn, and the data for the (n+1)-th line are inputted in the order of An+1, Bn+1. While the displaying data An are inputted, the switch SW is on the side of A to make the side of A in ON state. Therefore, the displaying data of An are successively stored in the RAM A by inputting the An data. After a while, when the input of the An data is finished, the switch SW is switched onto the side of B. This makes the Bn data successively store one after another in the RAM B. States of signals inputted to, held in and outputted from each of the RAM A and the RAM B are shown in the figure in being designated as "INPUT", "HOLD" and "OUTPUT", respectively. Storage of each of the An data and the Bn data in the RAM is started at the same time the input of the signal of the displaying data for n-th line is started. The storage is completed at the same time the inputting is finished. Each of the stored displaying data is outputted to each of image signal driving circuits during an input period for the next displaying data for the (n+1)-th line. At this time, as shown in FIG. 12, the displaying data of An and the displaying data of Bn are simultaneously outputted in synchronism with each other over the whole input period of the signal of the (n+1)-th line. This can reduce a frequency of the outputted displaying signal to half relative to the frequency of the inputted displaying signal.

The RAM A and the RAM B are allowed to have memory capacities of equivalent to a capacity of 1 line in total when the inputs and the outputs of the RAMs can be controlled simultaneously. Therefore, the RAM A and the RAM B can be easily built in a controller with little increase in respective circuit scales. Moreover, as is understood from FIG. 12, the maximum amount of the data for the RAM A becomes 1.5 times the maximum amount of the data for the RAM B. Therefore, the RAM A and the RAM B with dynamically allottable memory capacities can be more efficiently used. When the RAMs are provided with exclusive memory regions, it is necessary to increase the memory capacity for the RAM A more than the memory capacity for the RAM B, or to make the capacities for both RAMs equal to or more than the capacity necessary for the RAM A. However, the definite order of inputting and outputting data makes arithmetic operation processing, required for dynamically assigning memory regions, unnecessary to allow reduction in consumed electric power. In a signal inputted to the controller, a clock signal is included in addition to the displaying data. By the signal, the amount of displaying signal is determined. This is because the amount of displaying data is specified in detail for each of the signals under the standards VGA, XGA, SXGA and the like. Therefore, the controller can calculate out beforehand the time for switching between A and B of the switch SW. This easily enables realization of the above-explained data processing.

Figure 7:
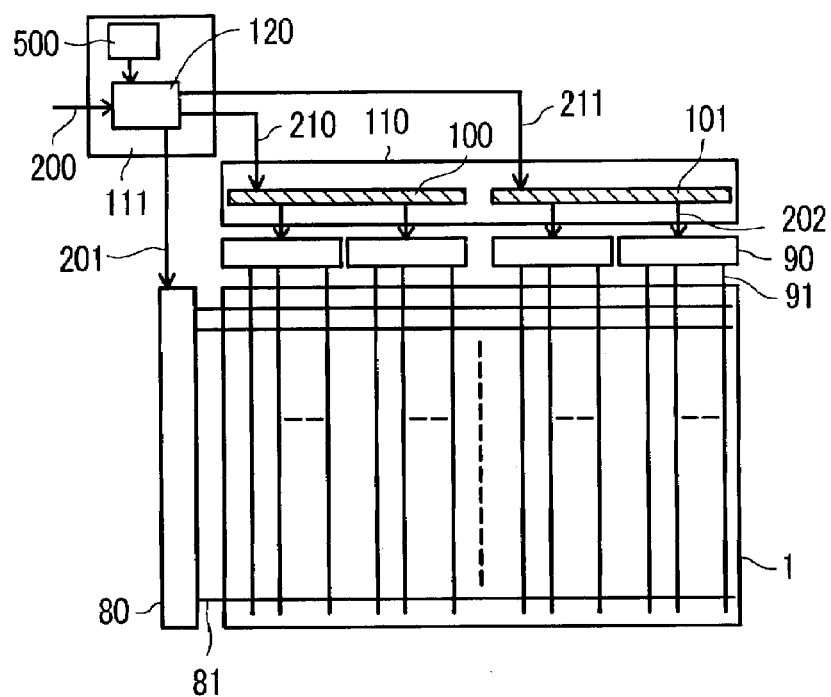
FIG. 7 is a schematic explanatory view illustrating signal transmission in the embodiment of the image displaying apparatus according to the invention.

FIG. 7 is a schematic view illustrating flows of the displaying data. The input data signal 200 is inputted to a controller 120 from outside. Reference numeral 111 denotes a controller circuit board. The controller 120 produces a scanning data 201 from the input data signal 200 to supply the scanning data to a scanning signal driving circuit 80. Moreover, the controller 120 divides the displaying data into a first displaying data 210 and a second displaying data 211 by the above-explained way to simultaneously supply the divided displaying data to respective displaying data buses. At this time, the first displaying data 210 is supplied to a left displaying data bus 100, and the second displaying data 211 is supplied to a right displaying data bus 101. The displaying data bus is a bus in which a plurality of wires are arranged in parallel with the number thereof depending on the number of bits of the displaying data. Therefore, with each of three colors of RGB displayed in, for example, 8 bits, data wiring is to be provided with 8×3=24 wires arranged in parallel, by which a wide region is occupied. For example, with wires, each having a width of 0.1 mm, arranged at intervals of the same 0.1 mm, a region of 4.8 mm is necessary. Downsizing of such a region is important for reducing an external size of a region except an image displaying region in the image displaying apparatus. Thus, as shown in FIG. 7, in the embodiment, bus lines, by which the displaying data are simultaneously transmitted, are made provided as the left displaying data bus 100 and the right displaying data bus 101 which are separately disposed exclusively on the left and on the right, respectively. That is, in a longitudinal direction of a signal transmitting circuit board 110, a region for extending the first bus line, a region formed without bus lines and a region for extending the second bus line were formed in the order. This allows the image displaying apparatus to be made up without increasing an external size thereof even with the arrangement in which the displaying data are simultaneously supplied to two bus lines. The displaying data supplied to the data buses are further supplied to image signal driving circuits 90 as displaying data 202. The image signal driving circuits capture the displaying data from data corresponding to the line at an end in order. The data capture, since the displaying data are separated into two series, is also carried out simultaneously in the image signal driving circuit group for the left side of the screen and in the image signal driving circuit group for the right side of the screen. That is, the data are simultaneously captured into the left and right regions in synchronism with each other.

The frequency reduced to half allows the time for capturing the data to be doubled. This can ensure the data capture to prevent occurrence of data errors. Even in the case in which the signal carries noise, the lengthened capture time makes the data capture stable to enable realization of a noise resistant image displaying apparatus.

After the data are captured, in synchronism with outputting of signals from the scanning signal driving circuit 80 to scanning signal lines 81, displaying signals are supplied from the image signal driving circuits 90 to image signal lines 91 for realization of display of the displaying unit 1.

Next, an explanation will be made about a method of stabilizing a quality of a displayed image for a plurality kinds of input signals. To each of pixels in the displaying unit 1, as shown in FIG. 7, signals are supplied from at least the image signal lines and the scanning signal lines. Therefore, it is important to control timing of a signal in the image signal line and a signal in the scanning signal line.

Figure 13A:
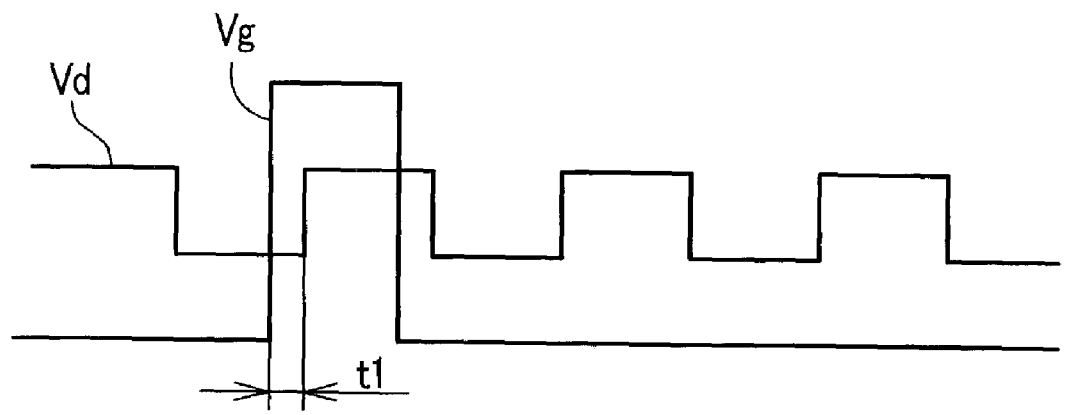
FIGS. 13A to 13D are explanatory views illustrating signal processing in the embodiment according to the invention.
Figure 13B:
Figure 13C:
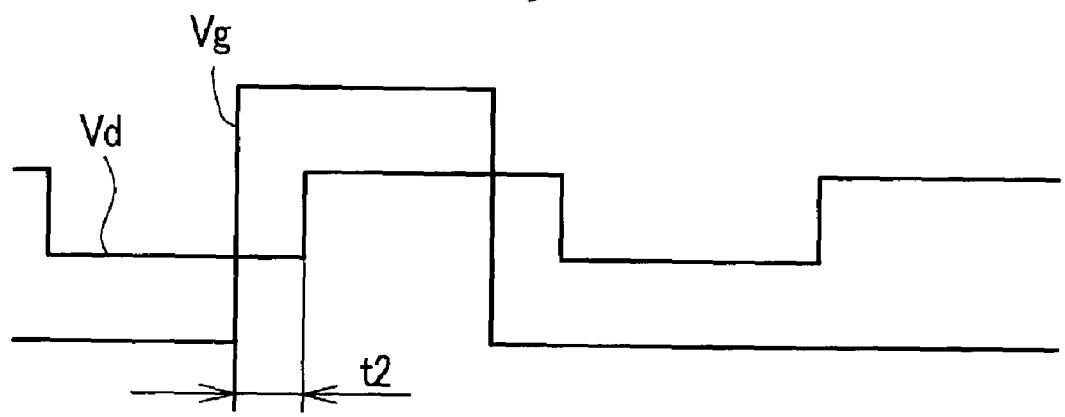

A method of controlling signal timing will be explained by using FIG. 13. FIG. 13A is a view showing an example of waveforms of display signals with a high frequency, for example, signals for carrying out display under the standard such as SXGA. Both of a scanning signal Vg and an image signal Vd are signals which are switched in a short time. AT the switching, a time difference t1 is to be provided between rising edges of Vg and Vd. FIG. 13C is a view showing an example of waveforms of display signals with a low frequency, for example, signals for carrying out display under the standard such as VGA. A time difference between rising edges of Vg and Vd becomes t2. Here, For keeping a stabilized image quality for various kinds of displaying signals, t1 and t2 are desirably made approximately equal. This is because writing of Vd to a displaying electrode of a pixel is carried out by a thin film transistor element TFT (not shown) provided near each of intersections of the scanning signal lines 81 and the image signal lines 91, and operation characteristics of the TFT are determined as intrinsic characteristics of the TFT element, which necessitates t1 and t2 to be made approximately equal to each other for making the image quality more uniform. Otherwise a signal level of the signal Vd changes to next signal level before Vg becomes OFF, which affects a signal to be written in the pixel to make the value of the signal different from the targeted value. Following method enables realization of t1 and t2 maintained approximately equal for input signals with frequencies different from each other as above.

Figure 13D:

In the input data signal 200, applied to the controller from out side, a synchronizing signal and a clock signal are included in addition to the displaying data. The frequency of the clock signal is changed in compliance with a frequency of the displaying data. FIG. 13B shows a state of a clock for the displaying data with a high frequency corresponding to the signals shown in FIG. 13A. FIG. 13D shows a state of a clock for the displaying data with a low frequency corresponding to the signals shown in FIG. 13C. It is shown that t1 corresponds to a large number of clocks for the displaying data with the high frequency, while t2 corresponds to a small number of clocks for the displaying data with the low frequency. Therefore, when a frequency of an external clock is high, Vd can be changed after a specified number of clocks m is inputted after rising of Vg. While, when a frequency of the external clock is low, Vd can be changed after a specified number of clocks p is inputted after rising of Vg. With the numbers m and p adequately determined, t1 and t2 can be made approximately equal.

Here, an example of a method of determining m and p. Adequate determination of m and p is easily carried out by ascertaining the frequency of the external clock. Namely, for example, when the frequency of the clock shown in FIG. 13B is 100 MHz and the frequency of the clock shown in FIG. 13D is 50 MHz, the numbers p and m are determined depending on a ratio of the numbers of the clocks, namely p can be well determined as one half of m. Therefore, a subject is how to find the frequency of the external clock. The frequency can be measured by using a second clock. In FIG. 7, a built-in clock circuit 500 is shown as the second clock generator. This can be formed as a crystal oscillator. An output from the crystal oscillator is an analog signal, which can be converted to a digital clock by providing a threshold circuit in the controller. With reference to the clock signal from the built-in clock circuit, the number of external clocks per unit time is counted by the controller. This can determine the frequency of the external clock.

In this way, the period between the rising edge of the image signal and the rising edge of the scanning signal is controlled by using the number of clocks inputted from outside. The number of clocks inputted from outside in a unit time is measured by the clock generated by the built-in clock circuit contained in the image displaying apparatus. When a measured value is large, the number of clocks in the period between the rising edge of the image signal and the rising edge of the scanning signal is increased. While, when the measured value is small, the number of clocks in the period between the rising edge of the image signal and the rising edge of the scanning signal is decreased. This allows t1 and t2 to be controlled to become approximately equal. Since the number of the external clock per unit time can be measured, t1 and t2 can be of course varied by the frequency of the external clock. This is because t1 and t2 can be balanced with respective writing times. Such a control becomes possible because the inputted clock is counted by using the above-explained built-in clock. Therefore, as far as the concept is applied to a control, however subsequent control is carried out, the control based on the above concept is effective in various ways as other embodiments according to the invention.

Embodiment 2

Figure 8:
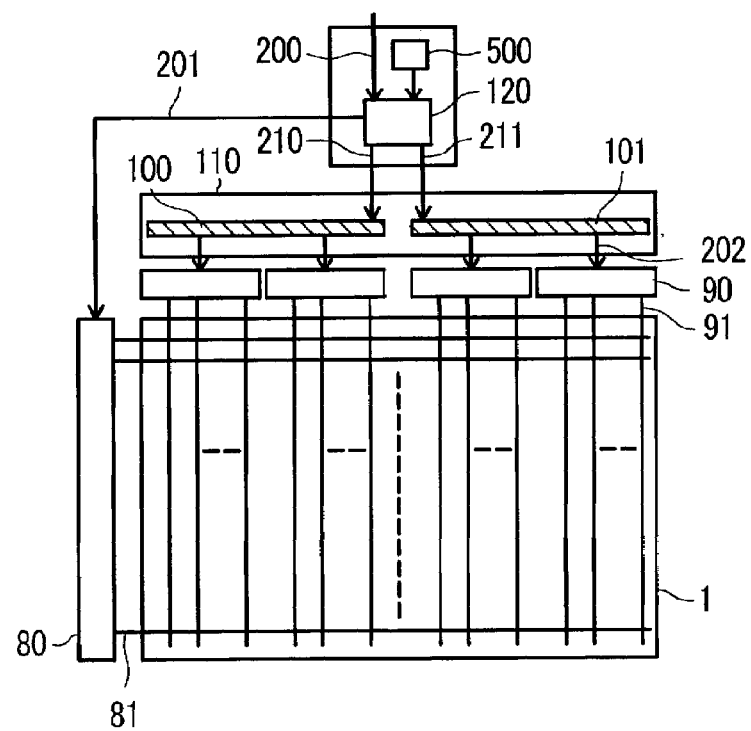
FIG. 8 is a schematic explanatory view illustrating signal transmission in another embodiment of the image displaying apparatus according to the invention.

The difference between the embodiment 2 and the embodiment 1 is in the way of supplying displaying data to the data bus shown in FIG. 7. FIG. 8 is a view corresponding to FIG. 7 showing the embodiment 1. In the embodiment 2, the first displaying data 210 and the second displaying data 211 from the controller 120 are supplied from a portion approximately at the center of the signal transmitting circuit board 110 to the left displaying data bus 100 and the right displaying data bus 101, respectively. The left displaying data bus and the right displaying data bus are formed on the signal transmitting circuit board 110 and are started from the portion approximately at the center of the signal transmitting circuit board 110 to be extended thereon in directions opposite to each other. This makes the first displaying data 210 and the second displaying data 211 transmitted in the data buses approximately equal to each other in length to enable realization of an image displaying apparatus noise-resistant without data errors.

Figure 9:
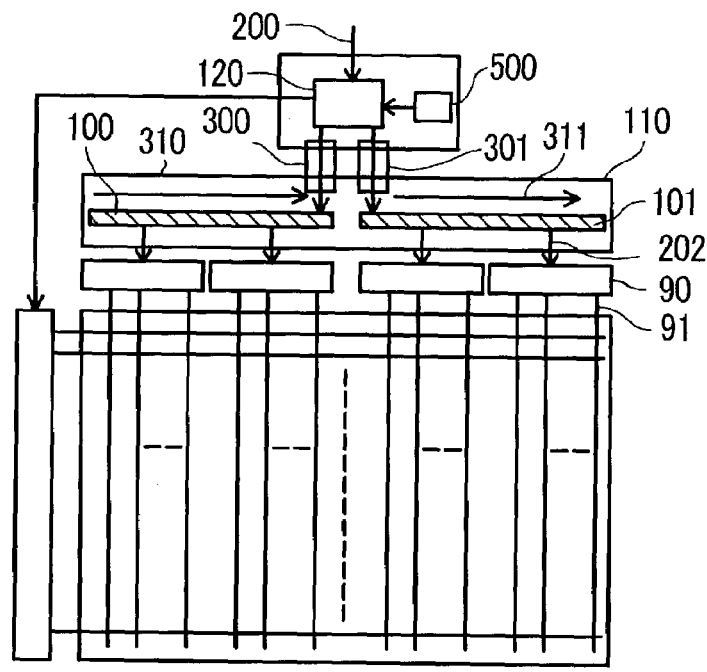
FIG. 9 is a schematic explanatory view illustrating signal transmission in another embodiment of the image displaying apparatus according to the invention.

FIG. 9 is an explanatory view illustrating an example of flows of the signals shown in FIG. 8. Displaying data for the left side of the screen and displaying data for the right side of the screen supplied to the left displaying data bus 100 and the right displaying data bus 101, respectively, are successively captured from the same side in order such as denoted by reference numerals 310 and 311. This enables ordinary semiconductor elements to be used in the image signal driving circuit to allow realization of cost reduction.

Embodiment 3

Figure 10:
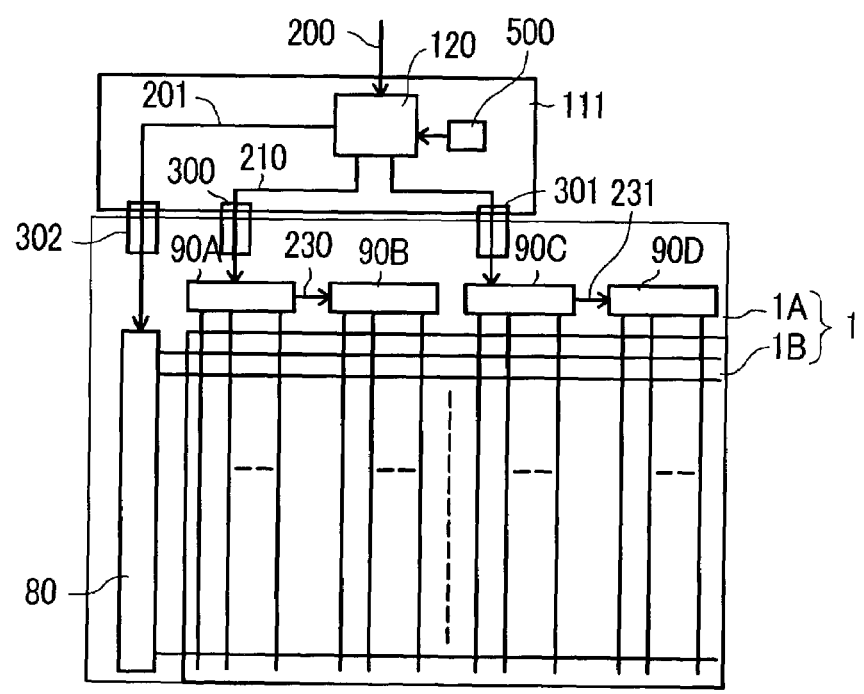
FIG. 10 is a schematic explanatory view illustrating signal transmission in further another embodiment of the image displaying apparatus according to the invention.

FIG. 10 is a view showing an arrangement corresponding to that shown in FIG. 9. The arrangement is provided with the signal transmitting circuit board 110 being removed therefrom. The image signal driving circuit 90 is directly mounted on a TFT substrate 1A of the displaying unit 1 to be arranged as a so-called COG system. In the figure, the scanning signal driving circuit 80 is also mounted together. The scanning data 201 from the controller 120 are supplied to the scanning signal driving circuit 80 through a gate FPC 302. The first displaying data 210 are supplied to an image signal driving circuit 90A through a drain FPC 300. The second displaying data 211 are supplied to the image signal driving circuit 90C through a drain FPC 301. The displaying data transmitted to the image signal driving circuit 90A are transmitted to an adjacent image signal driving circuit 90B as inter-driving-circuit transmission data 230 by wiring formed on the TFT substrate 1A in a TFT forming process. The displaying data transmitted to the image signal driving circuit 90C are transmitted to an adjacent image signal driving circuit 90D as inter-driving-circuit transmission data 231 by wiring formed on the TFT substrate 1A in the TFT forming process.

In the embodiment, the signal transmitting circuit board is omitted to allow realization of further cost reduction. Moreover, this also enables realization of further reduction of the external size.

Each of the above-explained embodiments and the technical concept disclosed in each of the embodiments, by applying a part or the whole thereof, enables realization of desired effects including the concept. Moreover, they can be of course combined.

Every embodiment as explained above can be used for a liquid crystal displaying apparatus and a spontaneous light emitting element such as an EL. Furthermore, about the fixing method, even though the method is applied to fixing of structure components other than those of the image displaying apparatus, the method can be effective in facilitating assembly work.

As explained in the foregoing in detail, according to the invention, measures can be taken against resonance in an image displaying apparatus with more than two frames to enable realization of an image displaying device with a good image quality, high reliability and unbreakable fixing portions.

The invention further enables realization of simplified assembly work of an apparatus with more than two frames.

Moreover, the invention enables realization of horizontal positioning of a plurality of structure components being stacked in layers surely and easily.

Furthermore, the invention allows realization of an image displaying apparatus capable of providing a stabilized displaying image quality for various kinds of input signals.

In addition, EMI can be improved and errors in a signal can be reduced by the invention.

What is claimed is:

1. An image displaying apparatus at least comprising a first structure component, a second structure component, a third structure component and a displaying unit, The first structure component being disposed on a lower side of the displaying unit, the third structure component being disposed on an upper side of the displaying unit, the second structure component comprising a first side and a second side opposing to the first side, the first side comprising a first fixing portion, the second side comprising a second fixing portion, each of the first fixing portion and the second fixing portion being formed approximately at the same position, wherein the first fixing portion is fitted to the third structure component, and the second fixing portion is fitted to the first structure component.

2. The image displaying apparatus according to claim 1, further comprising a backlight, the backlight being supported by the first structure component, the displaying unit being supported by the second structure component, and the third structure component comprising a display opening wherein the first side is a front side of the second structure component and the second side is a rear side of the second structure.

3. The image displaying apparatus according to claim 1, wherein the first fixing portion is a first projection fitted to a hole formed in the third structure component, and the second fixing portion is a second projection fitted to a hole formed in the first structure component.

4. The image displaying apparatus according to claim 3, wherein the first projections has a wide projecting width on a side oppose to the side of the displaying face, and the second projection has a wide projection width on a side opposite to the side of the displaying face.

5. The image displaying apparatus according to claim 4, wherein the second projection on the first structure component side is formed to have a wide projection width larger than the wide projection width of the first projection.

6. The image displaying apparatus according to claim 1, wherein the fixing portion is a first projection-like thick portion fitted to a hole formed in the third structure component and the second fixing portion is a second projection-like thick portion fitted to a hole formed in the first structure component.

7. The image displaying apparatus according to claim 6, wherein the first projection-like thick portion has a wide projection width on a side opposite to the side of the displaying face, and the second projection-like thick portion has a wide projection width on a side of the displaying face.

8. The image displaying apparatus according to claim 1, wherein the thicknesses in the fixing portions of the third structure component, the first structure component and the second structure component become larger in the order.

9. The image displaying apparatus according to claim 1, wherein the second structure component is made of resin material.

10. The image displaying apparatus according to claim 9, wherein the first structure component and the third structure component are made of metallic material.

11. The image displaying apparatus according to claim 1, wherein at least three of the fixing portions are formed on one side face of the image displaying apparatus.

12. The image displaying apparatus according to claim 1, wherein the fixing portions are provided on a first side face and a second side face, being perpendicular to each other, of the image displaying apparatus, the number of the fixing portions on the first side face being different from the number of the fixing portions on the second side face.

13. An image displaying apparatus at least comprising a displaying unit, a first structure component, a second structure component and a third structure component, wherein the third structure component is a frame supporting the displaying unit, the second structure component is a component forming a backlight unit, the first structure component is a frame supporting the backlight, and the first structure component is comprises a bent portion toward a side of the third structure component for carrying out horizontal positioning of the second structure component.

14. The image displaying apparatus according to claim 13, wherein the displaying unit is provided on the third structure unit.

15. The image displaying apparatus according to claim 14, wherein the second structure component is a light guide plate.

16. The image displaying apparatus according to claim 14, wherein the second structure component is an optical sheet.

17. The image displaying apparatus according to claim 16, wherein the optical sheet includes one of a light diffusing medium and a light concentrating medium.

18. The image displaying apparatus according to claim 13, wherein the first structure component is a metal frame and the third structure component is a resin frame.

19. The image displaying apparatus according to claim 13, wherein the third structure component is provided with a portion with a hole into which a tip of the bent portion is fitted.

20. The image displaying apparatus according to in claim 19, wherein the tip of the bent portion is positioned to the side of the third structure component 1 mm or more from the second structure component.

21. The image displaying apparatus according to claim 19, wherein the tip of the bent portion sticks out from a surface of the portion with the hole in the third structure component.

22. The image displaying apparatus according to claim 13, wherein the third structure component has a projected portion at the side of the first structure component which holds the bent portion between the projected portion and the second structure component.

23. The image displaying apparatus according to claim 13, wherein, the length of the bent being longer than the distance between the third structure component and the first structure component.

* * * * *